(12) United States Patent
Agardh

(10) Patent No.: US 9,867,213 B2
(45) Date of Patent: Jan. 9, 2018

(54) METHOD AND APPARATUS FOR TRAFFIC PATTERN DEPENDENT ACCESS COORDINATION TO A SHARED TRANSMISSION MEDIUM

(71) Applicant: Sony Corporation, Tokyo (JP)

(72) Inventor: Kåre Agardh, Rydebäck (SE)

(73) Assignee: Sony Mobile Communications Inc., Tokyo (JP)

(*) Notice: Subject to any disclaimer, the term of this patent is extended or adjusted under 35 U.S.C. 154(b) by 77 days.

(21) Appl. No.: 14/851,886

(22) Filed: Sep. 11, 2015

(65) Prior Publication Data

US 2017/0019923 A1 Jan. 19, 2017

Related U.S. Application Data

(63) Continuation of application No. PCT/EP2015/066043, filed on Jul. 14, 2015.

(51) Int. Cl.
| | |
|---|---|
| *H04W 84/12* | (2009.01) |
| *H04W 74/08* | (2009.01) |
| *H04W 72/10* | (2009.01) |
| *H04W 48/08* | (2009.01) |
| *H04W 72/04* | (2009.01) |

(Continued)

(52) U.S. Cl.
CPC ....... *H04W 74/0808* (2013.01); *H04W 48/08* (2013.01); *H04W 72/0446* (2013.01); *H04W 72/10* (2013.01); *H04W 84/12* (2013.01); *H04W 88/02* (2013.01); *H04W 88/08* (2013.01)

(58) Field of Classification Search
CPC . H04W 74/0816; H04W 28/02; H04W 74/08; H04W 72/1242; H04W 52/08; H04W 74/06; H04W 46/14; H04W 84/12; H04W 84/18; H04B 7/2643
See application file for complete search history.

(56) References Cited

U.S. PATENT DOCUMENTS

| | | | |
|---|---|---|---|
| 2004/0218632 A1* | 11/2004 | Kang | H04W 28/02 370/474 |
| 2006/0034219 A1* | 2/2006 | Gu | H04L 12/5695 370/329 |

(Continued)

FOREIGN PATENT DOCUMENTS

WO    2014110397 A1    7/2014

OTHER PUBLICATIONS

Oteri, Oghenekome et al. "Advanced Power Control Techniques for Interference Mitigation in Dense 802.11 Networks", 2013 16th International Symposium on Wireless Personal Multimedia Communications (WPMC), NICT, Jun. 24, 2013, pp. 1-7, XP032493927 [retrieved on Feb. 10, 2013].

(Continued)

*Primary Examiner* — Andrew Lee
(74) *Attorney, Agent, or Firm* — James C. Edwards; Moore & Van Allen PLLC (57) ABSTRACT

A method and apparatus for coordinating access to a shared transmission medium in a Wireless Local Area Network (WLAN), in order to minimize the risk for collisions. The method includes identifying a station associated with a first basic service set (BSS), and providing access opportunity to the station on the shared transmission medium in one or more time slots, which time slots are assigned dependent on a traffic pattern of the station.

11 Claims, 3 Drawing Sheets

(51) Int. Cl.
  *H04W 88/02* (2009.01)
  *H04W 88/08* (2009.01)

(56) References Cited

U.S. PATENT DOCUMENTS

| | | | | |
|---|---|---|---|---|
| 2009/0279427 | A1* | 11/2009 | Ji | H04W 74/0816 370/230 |
| 2012/0020229 | A1* | 1/2012 | Dayal | H04W 16/14 370/252 |
| 2012/0094680 | A1* | 4/2012 | Stackelius | H04W 72/1242 455/452.1 |
| 2013/0142180 | A1* | 6/2013 | Gidlund | H04W 74/085 370/337 |
| 2013/0235720 | A1 | 9/2013 | Wang et al. | |
| 2013/0294420 | A1* | 11/2013 | Ko | H04W 74/06 370/336 |
| 2014/0177546 | A1* | 6/2014 | Kang | H04L 5/06 370/329 |
| 2014/0198642 | A1* | 7/2014 | Barriac | H04W 74/08 370/230 |
| 2015/0327262 | A1* | 11/2015 | Kwon | H04W 72/0446 370/329 |
| 2016/0135199 | A1* | 5/2016 | Wang | H04W 74/0816 455/450 |
| 2016/0345270 | A1* | 11/2016 | HomChaudhuri | H04W 52/08 |

OTHER PUBLICATIONS

Ghosh, Chittabrata et al. "Group Synchronized DCF" IEEE SA Mentor; 11-12-0329-01-OOAH-Group-Synchronized-DCF, IEEE-SA Mentor, Piscataway, NJ USA, vol. 802.11ah, No. 1, Mar. 13, 2012, pp. 1-13, XP068038643 [retrieved on Mar. 13, 2012].

Khorov, Evgeny et al. "A survey on IEEE 802.11ah: An enabling networking technology for smart cities", Computer Communications, vol. 58, Mar. 1, 2015, pp. 53-69, XP029200607, ISSN: 0140-3664, DOI: 10.1016/J.COMCOM2014.08.008.

International Search Report and Written Opinion; dated Mar. 21, 2016; issued in International Patent Application No. PCT/EP2015/066043.

* cited by examiner

METHOD AND APPARATUS FOR TRAFFIC PATTERN DEPENDENT ACCESS COORDINATION TO A SHARED TRANSMISSION MEDIUM

TECHNICAL FIELD

This application relates to methods and systems for coordinating access to a shared transmission medium, in particular to solutions for handling access of different stations to a Wireless Local Area Network (WLAN), dependent on traffic pattern. Specific solutions target the problem of coordinating access in situations where different WLANs overlap.

BACKGROUND

The deployment of wireless networks, such as solutions based on IEEE 802.11, has increased rapidly, and continues to do so. In addition, the data transmission bandwidth continues to increase with new releases of WLAN technology. As a result, an ever increasing multitude of stations, most notably mobile stations, being capable of communicating through WLAN, are taken into use. This results in dense environments, where large numbers of stations may compete to gain access to the Internet or other services, through the use of WLAN.

In WLAN, radio traffic is provided on a shared transmission medium. One state of the art solution used for coordinating Media Access Control (MAC) is denoted Carrier Sense Multiple Access (CSMA), which may be carried out in a variety of modes. This method involves the use in a transmitter of feedback from a receiver, to determine whether another transmission is in progress before initiating a transmission. The CSMA method may be further combined with other techniques for providing suitable coordination of data traffic. One example of such a technique is CSMA with Collision Avoidance (CSMA/CA), by means of which transmission is deferred for an interval if the channel is sensed busy before transmission, which reduces the probability of collisions on the channel. Other CSMA techniques include CSMA with Collision Detection (CSMA/CD).

With the high increase of stations competing to gain access to a WLAN Access Point (AP), there is however still need for improvement in the art of coordinating access to a shared transmission medium. One problem related to the high-density deployments of such networks is the risk of overlap of Basic Service Sets (BSSs), where plural APs are provided with at least partly overlapping communication range. Simultaneous transmission from such APs and stations in such a scenario may cause collisions, which can result in excessive management traffic and reduction of throughput.

SUMMARY

Solutions to this problem are provided herein, by means of a method and an apparatus or system for carrying out such a method. The method may be a computer-implemented method, carried out by executing computer program code, stored in a memory, by means of processor in an apparatus connected to a WLAN AP.

According to a first aspect, a method is provided for coordinating access to a shared transmission medium in a Wireless Local Area Network (WLAN), comprising the steps of:

identifying a station associated with a first basic service set (BSS);
providing access opportunity to the station on the shared transmission medium in one or more time slots, which time slots are assigned dependent on a traffic pattern of the station.

In one embodiment, the step of providing access opportunity in time slots assigned dependent on traffic pattern is carried out responsive to determining that the station is in an edge region of the first BSS with respect to a first access point (AP).

In one embodiment, the method comprises the step of coordinating access opportunity provided to the station with other stations associated with a second overlapping BSS (OBSS).

In one embodiment, the method comprises the steps of determining a priority level for the traffic pattern based on a predetermined rule; and assigning time slots dependent on the priority level.

In one embodiment, the method comprises the step of providing stations of a first priority level access opportunity within a first set of time slots, while denying access opportunity to stations of a second, lower, priority level within the first set of time slots.

In one embodiment, the method comprises the step of providing stations of the second priority level access opportunity within a second set of time slots, not including time slots of the first set of time slots.

In one embodiment, the method comprises the step of providing stations of the first priority level access opportunity within the second set of time slots.

In one embodiment, stations of the first priority level are provided with access opportunity in separate time slots of the first group.

In one embodiment, the step of determining a priority level includes correlating the traffic pattern of the station to a Quality of Service (QoS) access category (AC) according to Wi-Fi Multimedia (WMM).

In one embodiment, the method comprises the step of determining a priority level includes calculating a rolling average of packet size of data traffic for the station; and setting a priority level dependent on calculated packet size.

In one embodiment, stations being provided with access opportunity in the same time slots are allowed access to the shared transmission medium under carrier sense multiple access (CSMA).

According to a second aspect, an apparatus for coordinating access to a shared transmission medium in a WLAN is provided, comprising an AP configured to provide radio communication with stations in basic service sets, a processor configured to execute program code, and a memory comprising instructions that when executed by the processor cause the apparatus to provide access opportunity to stations on the shared transmission medium in one or more time slots, which time slots are assigned dependent on a traffic pattern of the station.

In one embodiment, the memory includes instructions that when executed cause the apparatus to determine a priority level for the traffic pattern based on a predetermined rule, and to assign time slots dependent on the priority level.

In one embodiment, the apparatus is configured to allow stations being provided with access opportunity in the same time slots access to the shared transmission medium under CSMA.

In one embodiment, the memory includes instructions that when executed cause the apparatus to carry out any of the method steps outlined above.

BRIEF DESCRIPTION OF THE DRAWINGS

Various embodiments of the invention will be described below with reference to the accompanying drawings, in which FIG. 1 schematically illustrates an example of WLAN devices set up for communication according to an embodiment.

DETAILED DESCRIPTION

A detailed description of various embodiments will now be described with reference to the drawings. This description provides detailed examples of certain possible implementations, but it should be noted that the details are intended to be exemplary and in no way limit the scope of the application. In addition, embodiments other than those described in detail may be put to practice.

Figure 1:
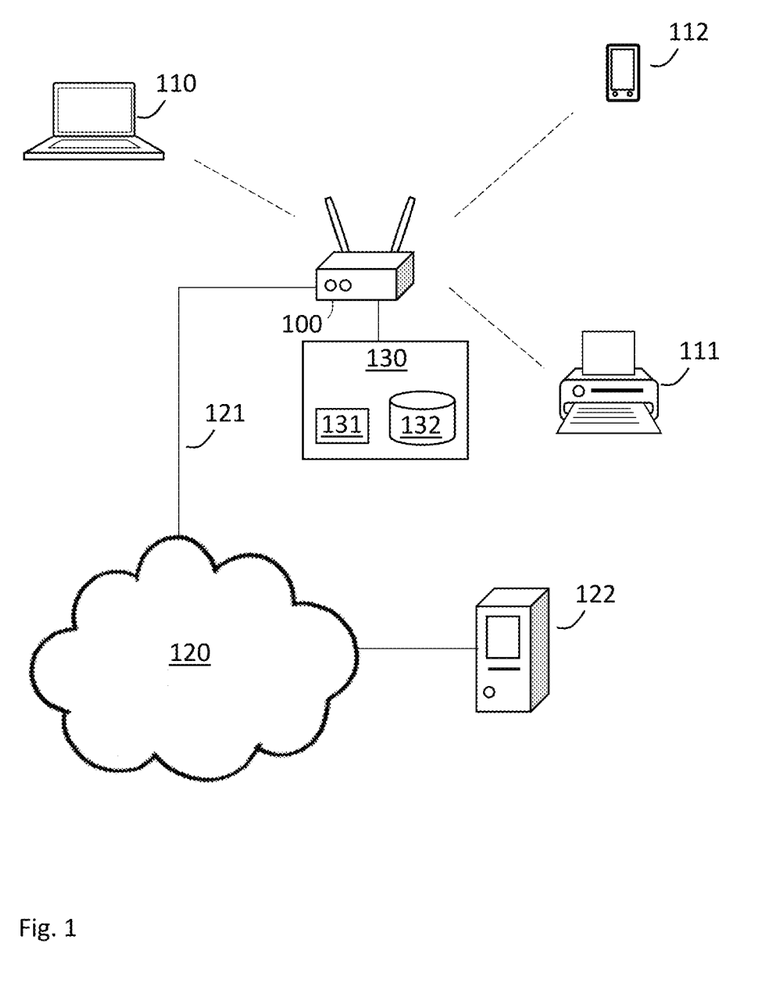

In FIG. 1 a number of WLAN devices are shown. The WLAN may include an access point (AP) 100, configured to interconnect wireless stations with wired network nodes. In the drawing, the WLAN devices include a station (STA) 110 in the form of a portable computer, a STA 111 in the form of a printer, and STA 112 in the form of a mobile phone. These are merely examples provided to indicate the principle, and that WLAN devices may include both substantially mobile or portable devices 110, 112, and substantially stationary devices 111. The WLAN may be configured to implement one or more protocols of the IEEE 802.11 communication standard. It may be noted, though, that the solutions provided herein may be applied to other network systems, in which devices are allowed to compete for access.

An AP and the STA(s) associated with the AP comprise a basic service set (BSS). In the example of FIG. 1, AP 100 and STAs 110, 111 and 112, may be comprised in a first BSS. An extended service set (ESS) may comprise one or more APs (with one or more BSSs) and STA(s) associated with the APs. An AP is typically connected to a distribution system 121, which may be wired and/or wireless, for carrying traffic between the AP and a destination outside the WLAN, such as a node 122, e.g. a server, connected via a network 120. Traffic between STAs within the WLAN may be sent through one or more APs. For example, a source STA 110 may have traffic intended for a destination STA 111.

WLAN devices, including STAs APs, may use a Carrier Sense Multiple Access with Collision Avoidance (CSMA/CA) channel access mechanism, wherein a device may sense the primary channel. If e.g. a STA 110 has data to send, the STA 110 may sense the primary channel. If the primary channel is detected to be busy, the STA 110 may back off. Channel access may include request to send (RTS) and/or clear to send (CTS) signaling. For example, an exchange of an RTS frame may be transmitted by a sending device and a CTS frame that may be sent by a receiving device. The CTS frame may include a time value that may alert other STAs to hold off from accessing the medium while the device initiating the RTS may transmit its data.

Any device in a WLAN, such as an AP or a STA, may include a processor, a memory, a radio receiver and/or transmitter, one or more antennas, etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like. The one or more processors may be integrated or not integrated with each other. Such processors may be integrated with one or more other functions, such as memory, and may perform signal coding, data processing, power control, input/output processing, modulation, demodulation, and/or any other functionality that may enable the device to operate in a wireless environment, such as the WLAN of FIG. 1. The processor may be configured to execute processor executable code, such as software and/or firmware instructions. For example, the processer may be configured to execute computer readable instructions included on one or more of the processor or memory. Execution of the instructions may cause the device to perform one or more of the functions described herein.

Transmit Power Control (TPC) in a wireless network may be used for minimizing interference between nodes, improving wireless link quality, reducing energy consumption, controlling the network topology, reducing interference with satellites/radar or other technologies, or improving coverage in the network. TPC in wireless networks may be open loop or closed loop. In open loop TPC, the transmitter may control transmit power independent of the receiver. In closed loop TPC, the receiver may direct the transmitter to increase or decrease the transmit power of the transmitter based on one or more metrics. TPC may be implemented in a number of ways in different wireless networks. TPC in WLANs may be MAC based and may involve the transmission and reception of TPC MAC packets. The TPC may support the adaptation of the transmit power based on one or more information elements (IEs) including, for example, path loss, link margin estimates etc. This TPC is open loop and the transmitting node (e.g., an AP or a STA) may determine transmit power independent of the receiving node.

In cellular networks, inter-cell coordination schemes may be used to manage interference by coordinating transmission and reception between cells, based upon deliberate multiple-access scheduling over time and frequency in a fraction of the transmission bandwidth. As opposed to the cellular scenario, the scheme described herein may leverage the random access nature of CSMA/CA across the entire transmission bandwidth. Interference coordination in WLAN networks may be proprietary and may be carried out in wireless network controller at layers higher than the PHY and MAC. Some of the wireless LAN networks may use techniques that may be coordinated to reduce the effect of a large number of APs and/or STAs. For example, in IEEE 802.11ah based networks, different types of overlapping BSS (OBSS) networks may interfere with each other. Such OBSS issues may be addressed by minimizing interference between the overlapping networks and sharing the channel in time domain. Time division mechanisms may be utilized with physical grouping or logical grouping of STAs with an emphasis on transmission in dedicated sectors.

WLAN networks may be deployed in dense environments with multiple APs and BSSs. The high density deployment may result in an overlap of adjacent BSSs. One of the key problems in dense environments is the disturbances coming from overlapping networks (OBSS) operating on the same channel. When multiple OBSSs use the same frequency bands, interference may be a problem, e.g., for the STAs on the edge of coverage. The increased interference may result in a reduction in the network throughput as seen at the MAC layer, the MAC goodput, and an increase in energy expenditure. The effect of the interference on the MAC goodput and energy efficiency of the network may be mitigated. Known and studied methods to minimize OBSS impact include alternation of devices output power in order to lower overall noise and "unneccesary" range. Also, different scheduling mechanisms are evaluated that could minimize collisions and hence increase aggregated throughput. When available, the adjacent APs may choose different frequency bands of operation. In some networks, the use of different frequency may not be possible. Independent operation of CSMA/CA in each OBSS may result in simultaneous transmissions from multiple APs resulting in collisions and causing excessive management traffic or prevention of transmissions due to collision avoidance, resulting in the reduction of throughput.

Figure 2:
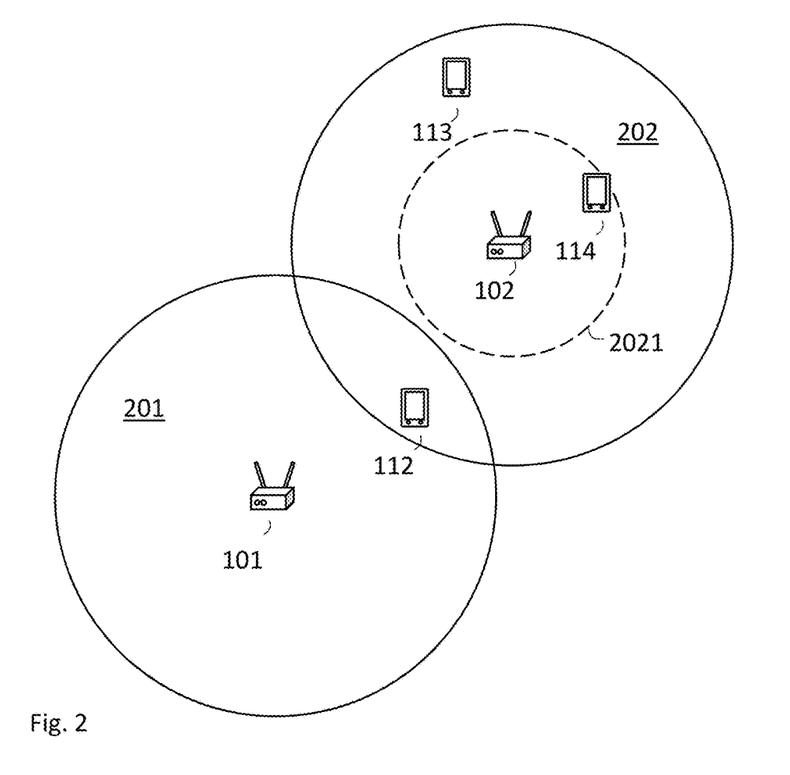
FIG. 2 illustrates an example of transmission in overlapping basic service sets.

FIG. 2 illustrates an example of transmission in OBSSs and the related problem. In the drawing, a first AP 101 forms a first BSS 201 together with at least a first STA 112. A second AP 102 forms a second BSS together with at least a second STA 113. The two BSSs 201, 202 overlap at least partly. More specifically, in the scenario of FIG. 2, the first station 112 may be within reception range of the second AP 102. APs 102 and 202 may transmit data, independently and simultaneously, to any of the STAs in their BSSs, e.g. STAs 112 and 113, respectively. As a consequence, transmission from AP 101 to STA 112 in BSS 201 may fail due to the transmission from AP 102 to STA 113 in BSS 202.

Such transmission failure issue may be addressed for network throughput improvement and energy efficiency. One attempt at targeting this problem was provided in Advanced Power Control Techniques for Interference Mitigation in Dense 802.11 Networks, by Oteri et al., of InterDigital Inc. The solutions discussed therein were also outlined in WO2014/179713A1 by the same inventors. There proposition is to implement a fractional CSMA/CA technique, by user grouping, enhanced transmit power control, and inter-BSS coordination used to improve the system performance of a dense, overlapped network with multiple BSSs. Using TPC, inter-BSS coordination, and user grouping two APs in an OBSS may transmit simultaneously with little or no collisions. In a fractional CSMA/CA method, a fraction of the total STAs may be permitted to access the channel at a particular time. To limit the amount of interference, the access duration may be coordinated between multiple BSSs. Using TPC, the interference resulting from the coordinated transmissions may be limited. Using the coordinated transmission as described herein, the area covered by the transmissions (e.g., the coverage area) of a subset of the BSSs in the network may be implicitly reduced, thereby reducing the amount of overlap between BSSs and improving the system performance.

In the solution proposed by Oteri et al, which may or may not form a basis for the solutions provided herein, the STAs in each BSS are grouped into one or more groups based on the amount of interference the STAs may receive from other BSSs or offer to other BSSs in the network, whereby STAs are partitioned into BSS-edge STAs and BSS-center STAs.

A BSS-edge STA may be adversely affected by a neighboring BSS during reception or may adversely affect a neighboring BSS during transmission. A BSS-center STA may be a non-BSS-edge STA. In FIG. 2, such a BSS-center STA 114 is shown for BSS 202. In case of transmission between an AP 101 and a BSS-edge STA 112 in a first BSS 201, the neighboring BSS 202 may limit its transmission to BSS-center STAs, such as STA 114, and not transmit to BSS-edge STAs 113. The neighboring BSS 202 may also control its power by TPC or even enhanced TPC, so as not to reach edge parts of the BSS 202. This may limit its interference effect on the STA 112 in the first BSS 201. Timing and coordination may be provided, such that one or more BSS center STAs may be placed in an active CSMA/CA pool. To limit the amount of interference between adjacent or overlapping BSSs, the timing of the edge BSSs (e.g., placed in the active CSMA/CA pool) may be coordinated between overlapping BSSs. The coordination may be centralized or distributed. The timing of the edge BSSs may be controlled such that the adjacent groups are orthogonal or partially orthogonal.

If the APs in a network are F-CSMA/CA capable, each AP may identify the BSS-edge STAs and non BSS-edge STAs under its control. BSS-edge STAs may be identified using a one or more of techniques including, for example, path loss, physical/geographic location, STA assisted, genie aided etc. The networks with F-CSMA/CA capabilities may be checked using an F-CSMA/CA capabilities signaling field. If neighboring APs do not support the feature or are instructed not to use the feature, the packet transmission may follow using legacy operation, e.g. 802.11ac, 802.11ah, etc.

In each BSS, the STAs may be grouped based on a desired criteria e.g. BSS edge, BSS center, etc. For example, Group 1 may include BSS center STAs in each of the BSSs, group 2 may include BSS edge STAs in odd numbered BSSs, and group 3 may include BSS edge STAs in even numbered BSSs. One or more APs may coordinate to allow access of each to the pool of STAs performing CSMA/CA based on the BSS index. For example, Group 1 may be placed in the active CSMA/CA pool. Groups 2 and 3 may be placed in the active CSMA/CA pool in a coordinated manner during particular time slots. The coordination may be such that groups 2 and 3 are in orthogonal pools e.g., when group 2 is in the pool, group 3 may not be in the pool, or in partially orthogonal pools. The STA grouping may be combined with TPC to limit interference. The transmit power may be adjusted based on the group in the active CSMA/CA pool. The maximum transmit power may determine the power at which the control frames needed by each of the STAs may be sent. If group 1 is in the pool, the maximum transmit power may be limited to the worst STA in the limited group, such as the STA that may require the maximum transmit power in group 1. The maximum transmit power may be used for both data and control frames.

Figure 3:
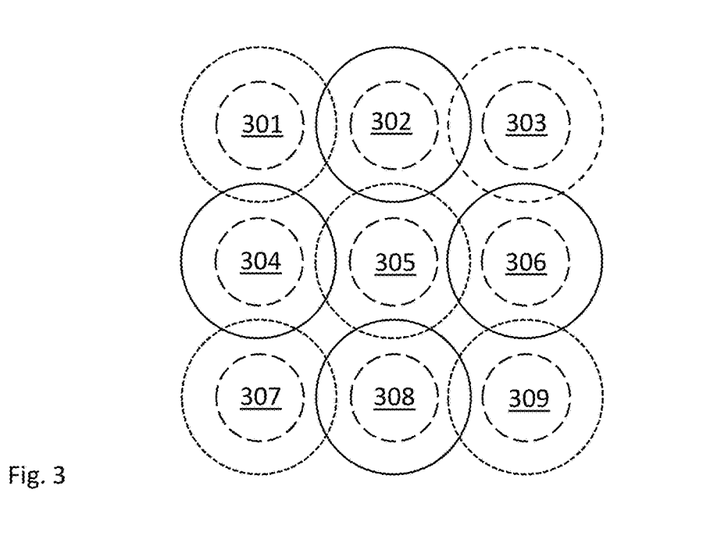
FIG. 3 illustrates an example of a WLAN system with BSS-edge and BSS-center partitioning, to which various embodiments apply.

FIG. 3 illustrates an example of a WLAN with a number of OBSSs 301-309. In each of these, the respective BSS has a BSS-edge and BSS-center partitioning, where STAs present within the dashed circle may be determined to form part of a BSS center group. STAs located within the respective outer circle but outside the dashed circle may be determined to form part of a BSS edge group. As can be seen, some of those BSSs are indicated with dotted line outer circles, in this example the odd numbered BSSs, whereas the others circle of the even numbered BSSs are full drawn. In one example, all STAs deemed to be BSS center may form part of a first group G1. Furthermore, orthogonality may be provided for edge STAs by suitable grouping, which are given access in different time periods.

Figure 4:
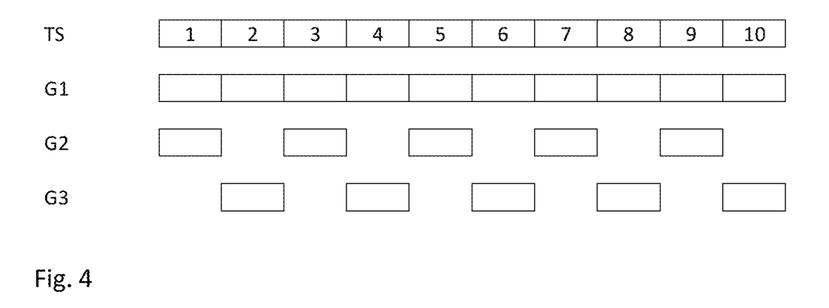
FIG. 4 illustrates an example of separation of access opportunity into groups relevant for a system of FIG. 3, according to which some embodiments apply.

FIG. 4 illustrates the time segmentation of different STA groups schematically, where a series of 10 time periods TS are indicated. The G1 STAs may be placed in an active CSMA/CA pool in each of the time slots. Edge STAs may be placed in two different groups G2 and G3, respectively. In accordance with the drawing of FIG. 2, edge STAs of odd number BSSs are placed in group G2, and edge STAs of even number BSSs are placed in group G3. STAs of G2 and G3 may be placed in the active CSMA/CA set during specific time-slots. The grouping may be combined with TPC to limit interference. To limit the amount of interference between OBSSs, the timing between the different groups may be coordinated between overlapping BSSs. The coordination may be centralized or distributed, and the coordinated timing across adjacent BSSs may be set to be fully orthogonal (e.g., where there is no interference between interfering groups) or partially orthogonal (e.g., where the interfering groups may have some level of overlap, up to a desired orthogonality level). Orthogonality between groups may be achieved, for example, by using beacons and the beacon intervals. Further details of the grouping and embodiments for avoiding collision are outlined in the aforementioned publication WO2014/179713A1, which is incorporated herein by reference.

A challenge with the state of the art solution is that, in order to be efficient, devices that are in edge regions have to be classified smartly for the scheduling to have effect, and the previously proposed solution involves classifying devices in groups based on path loss, expected RSSI, GPS location as well as with manual settings, to identify edge regions where collisions are more likely. The inventors of the solutions proposed herein, though, have studied large volumes of short data packets in today's networks, and thereby identified their key impact on system capacity. A proposed solution is therefore to classify STAs based on the traffic patterns they generate/consume, and then to provide access opportunity to the station on a shared transmission medium in one or more time-slots, assigned dependent on a traffic pattern of the station. Such a solution may be used to minimize or avoid collisions in overlapping BSSs. As an alternative, or complement, classification of STAs dependent on traffic pattern may be used for coordinating access to different STAs within a non-overlapping BSS.

Traffic pattern may be identified via different methods, and different embodiments may be realized based on those methods. One way of identifying the traffic pattern of an STA is to make use of the 802.11e Wi-Fi Multimedia (WMM) solutions for Quality of Service (QoS), according to which data from each device may be classified in 4 different Access Categories (AC): voice, video, best effort, and background, with different priority levels. In such an embodiment, if the traffic is deemed to form part of one of those categories, a corresponding priority level may be determined for the traffic pattern as a predetermined rule.

In another embodiment, traffic pattern may be assessed based on calculation. One way of accomplishing this is by calculating a rolling average of packet size of data traffic for the station. A priority level may then be set dependent on inter alia calculated packet size as a predetermined rule. As a mere example, packets in the range of 10-100 μs may be determined to be small packets, packets in the range of 100-1000 μs may be determined to be medium size packets, whereas those above are large packets. In one embodiment, a first priority level is set for small packets, a second (lower) priority is set for medium packets, and a third priority level for large packets. This priority level may subsequently be used for that STA for a certain subsequent time period. After a certain periodicity, a new calculation is made, and possibly a new priority level may be set based on the calculation. However, the priority level may also be determined based on the traffic pattern as a combination of calculated packet size and e.g. latency sensitivity of the traffic, as will be outlined in more detail below. Calculations and assessments may be carried out in the AP, in the STA, which subsequently reports it to the AP, or in a network node connected to the AP.

Once a priority level for the traffic pattern has been determined based on a predetermined rule, one or more time-slots are assigned dependent on the priority level, which may be carried out in different ways. The coordination of access may be made possible by means of each STA telling the AP of the BSS to which class, or priority level, it belongs according to WMM. As an example, a voice or video application may inform a STA chipset, responsible for handling radio communication with an AP, which AC it belongs to or which priority level it shall have according to WMM. The AP may then coordinate access to different time slots, dependent on the received in formation of that and other STAs. In an alternative solution, the AP simply informs the STAs of the BSS, e.g. by broadcast, which time slots are available for the respective AC or priority level, and then the STAs will have to follow those instructions in a WMM based solution. This minimizes the need for the STAs to send new data to the AP when their traffic pattern changes, which means a potential for less control data traffic in the BSS. In an embodiment, in which calculation of average packet size is carried out, time-slots for access to the shared medium may be assigned by the AP dependent on the priority level set based on e.g. the last calculation.

The assigning of time slots on the shared medium may be based on an aggregate assessment of the STAs that may collide, of one BSS or of OBSSs. For instance, if there are no STAs of a certain priority level, e.g. no STAs of a certain AC or a certain packet size, there is no reason to save time slots for that priority level. Instead, access opportunity will be given to those STAs present in the BSS, preferably to the full extent provided by the AP.

In one embodiment, the assigning of time slots dependent on traffic pattern is employed only for a group of STAs risking collisions in OBSSs. As an example, such a solution may be applied only to edge STAs, e.g. identified to belong to a group G3 according to the assessments outlined above. In another embodiment, the assigning of time slots dependent on traffic pattern is employed for several groups of STAs, or all STAs, of a BSS.

Figure 5:
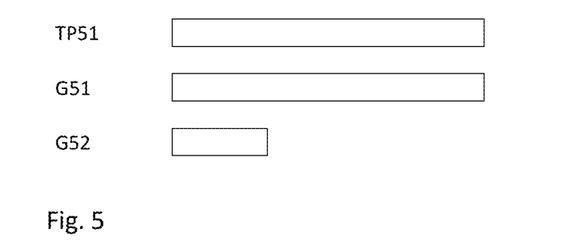
FIG. 5 illustrates time partitioning for different groups according to one embodiment.

FIG. 5 schematically illustrates assigning of time slots dependent on traffic pattern according to one embodiment, over a time period TP51. In one embodiment, the time period TP51 may correspond to one or more time periods TS according to FIG. 4, and the slot assignment may be employed for all STAs in e.g. one BSS. In such an embodiment, a subsequent time period could follow immediately upon completion of TP51, with an identical slot assignment, if the STA presence and traffic pattern remains the same. In another embodiment, time period TP51 may correspond to a time period TS assigned to STAs of a certain group, e.g. TS 1, 3, 5, . . . for group G2 of FIG. 4. In such an embodiment, the time slot assigning of FIG. 5 may be employed only for STAs of group G2, such as a subset of edge STAs, e.g. edge STAs of odd number BSSs. In other words, the boxes G51 and G52 in FIG. 5 would in such an embodiment take the place of boxes G2 in FIG. 4. In such an embodiment, a time period immediately subsequent to TP51 could be assigned to STAs of another group, e.g. a time period TS 2, 4, 6, . . . for group G3, in accordance with FIG. 4.

In accordance with what has been outlined above, a priority level for the traffic pattern may be determined based on a predetermined rule, e.g. according to the ACs of WMM or a calculated rolling average. In the example of FIG. 5, only 2 different priority levels are indicated. In one embodiment, this configuration may be based on a time slot assignment scheme in which STAs are only assigned to one of two different priority levels. In another embodiment, this configuration may be realized in a system which allows for more than two priority levels to be determined, such as three or four priority levels, but where, at present, only STAs of two priority levels are operating in the BSS in question.

In the embodiment of FIG. 5, STAs with different priority levels, based on traffic pattern, are placed in different groups. In the shown example, STAs of a first priority level are placed in group G51. Within G51, those STAs may compete for access under CSMA/CA. STAs of a second, lower, priority level are deemed to form part of a second group G52. The STAs of group G52 are only assigned time slots during a portion of the time period TP51, as indicated. Within that limited time portion, STAs of G52 may compete with each other, and with STAs of G51, for access under CSMA/CA. In this arrangement, STAs of the group G52 will not compete for access with the STAs of group G51 for at least a part of the time period TP51, thus giving access priority to the G51 STAs. The duration of the time period of access for G52, in relation to TP51 (and thus the time period of access for G51), may be set by the AP dependent on the number of STAs present in the BSS, or in the OBSSs, of the respective group. For example, if there are only one or few STAs in the higher priority group G51, the second group G52 may overlap to a larger extent with the first group G51, leaving a smaller time period during which the STAs of G52 do not compete for access with the STAs of G51, and vice versa. Preferably, this time extension assignment to the second group G52 is dynamically determined dependent on the STAs present in the BSS or OBSS. Furthermore, the time period assigned to group G52 need not be aligned to commence at the same time as the time period of group G51, as indicated. On the contrary, the period for G52 may start later than the period assigned to group G51, and may also be divided into smaller periods distributed over the TP51 time period, but aggregately covering a shorter time period than the period assigned to group G52. In one embodiment, STAs having a traffic pattern with smaller packets, such as voice data packets or low resolution video conferencing packets, may be placed in the first group, whereas STAs with a traffic pattern of larger packets, e.g. for data downloading or browsing which are less time sensitive, may be placed in the second group G52.

Figure 6:
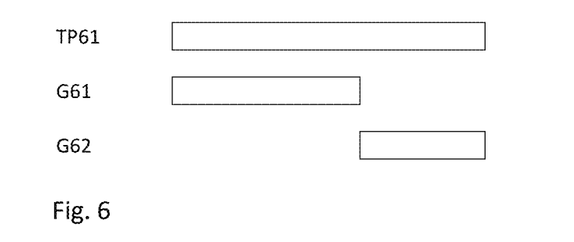
FIG. 6 illustrates an alternative way of time partitioning for different groups according to another embodiment.

FIG. 6 schematically illustrates assigning of time slots dependent on traffic pattern according to another embodiment, over a time period TP61. In one embodiment, the time period TP61 may correspond to one or more time periods TS according to FIG. 4, and the slot assignment may be employed for all STAs in e.g. one BSS. In such an embodiment, a subsequent time period could follow immediately upon completion of TP61, with an identical slot assignment, if the STA presence and traffic pattern remains the same. In another embodiment, time period TP61 may correspond to a time period TS assigned to STAs of a certain group, e.g. TS 1, 3, . . . for group G2 of FIG. 4. In such an embodiment, the time slot assigning of FIG. 6 may be employed only for STAs of group G2, such as a subset of edge STAs, e.g. edge STAs of odd number BSSs. Corresponding to what was mentioned for FIG. 5, the boxes G61 and G62 in FIG. 6 would in such an embodiment take the place of boxes G2 in FIG. 4. In such an embodiment, a time period immediately subsequent to TP61 could be assigned to STAs of another group, e.g. a time period TS 2, 4, . . . for group G3, in accordance with FIG. 4.

Also in the example of FIG. 6, only 2 different priority levels are indicated, for the sake of simplicity, although the scheme of FIG. 6 for assigning time slots may be realized in a system which allows for more than two priority levels to be determined, such as three or four priority levels. A priority level for the traffic pattern may be determined based on a predetermined rule, e.g. according to the ACs of WMM or a calculated rolling average. Also in the embodiment of FIG. 6, STAs with different priority levels, based on traffic pattern, are placed in different groups. In the shown example, STAs of a first priority level are placed in group G61. Within G61, those STAs may compete for access under CSMA/CA. STAs of a second, lower, priority level are deemed to form part of a second group G62. The STAs of group G62 are assigned time slots during a second time period, which is different from the time period assigned to STAs of G61, as indicated. Within the second time portion, STAs of G62 may compete with each other for access under CSMA/CA. In this arrangement, STAs of the group G62 will not compete for access with the STAs of group G61 at all. Such an embodiment may be beneficial where STAs of different priority levels are both important, but the traffic is of different packet size. Voice may e.g. be of higher priority, belonging to group G61, but also be transmitted in relatively small packets. If the second group G62 is assigned for e.g. high resolution streaming video, such packets are typically substantially longer. That means that, even if a voice packet is assigned to be scheduled with higher priority, the shared medium would be more likely to be occupied by a longer video streaming packet of lower priority, when a CSMA attempt is made to transmit the voice packet. In the embodiment of FIG. 6, this problem is targeted by assigning sole access to STAs of the first priority level in the time period assigned to group G61, while not allowing STAs of lower priority, e.g. of group G62, to compete for access during that time. The duration of the time period of access opportunity for G61 in relation to G62 may be set by the AP dependent on the number of STAs present in the BSS, or in the OBSSs, of the respective group.

If more than two priority levels may be assigned, the time period TP61 may be divided into more than two separate periods for the groups assigned. In another embodiment, one group G61 may be assigned to a first priority level, i.e. STAs desiring to access the shared medium with such a traffic pattern, or deemed to behave according to such a traffic pattern by average calculation. A second group G62 may then be assigned to STAs of two or more, or all, of any lower priority levels employed in the scheme, such as levels 2-4 according to WMM, or any traffic pattern having an average packet size than a certain threshold level, as calculated from previous transmission by packet inspection at the AP.

Figure 7:
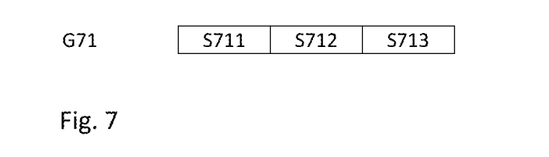
FIG. 7 illustrates time partitioning of a time period assigned to one group, according to some embodiments.

FIG. 7 illustrates an embodiment of a time period assigned to a group G71 of a certain priority level, in accordance with the above examples. Group 71 can be set for any one priority level, but will be described for the example of a highest priority group. Group G71 may thus e.g. be a more specific implementation of group G51 of FIG. 5, or of group G61 of FIG. 6. For each of the groups of the embodiments outlined above, the respective time period indicated may be seen as one time slot each. Alternatively, each one of those time periods may comprise a plurality of time slots. More particularly, FIG. 7 illustrates an embodiment in which three STAs of a common priority level of group 71 are assigned to different time slots S711, S712 and S713 in that group 71. This way, those three STAs will not compete with each other under CSMA for access during the period of G71, but will be provided with separate, orthogonal, time slots. Assignment of different time slots within a certain period may be controlled and signaled by the AP to the STAs in question. An embodiment of FIG. 7 may be beneficial for e.g. voice packets, which are small but of high priority.

The scheme according to FIG. 7, in which stations of a first priority level are provided with access opportunity in separate time slots of a common group G71, may be employed for all STAs of a BSS. In a preferred embodiment, though, the scheme under FIG. 7 is used for a high priority set of STAs in overlapping edge groups, such as G2 or G3 of FIG. 4. In such an embodiment, the orthogonal time slots S711, S712, S713 for group G71 may still have to compete under CSMA/CA with center STAs of group G1.

Returning to FIG. 1, the coordination of access to a shared transmission medium according to the embodiments given above may be carried out by an apparatus 130 in a WLAN comprising an AP 100, configured to provide radio communication with stations 110, 111, 112 in a BSS. The apparatus 130 may be included in or connected to the AP 100, or provided at another location in a network 120 in connection with the AP 100. The apparatus includes a processor 131 configured to execute program code, and a memory 132 comprising instructions that when executed by the processor 131 cause the apparatus to provide access opportunity to stations on the shared transmission medium in time slots assigned dependent on traffic pattern. In various embodiments, the apparatus 130 may be distributed in a WLAN system, where both processor 131 may include a plurality of different processor units, and memory 132 may include different local or virtual memories of different kind. In addition, the methods described herein may be implemented in a computer program, software, or firmware incorporated in a computer-readable medium for execution by a computer or processor.

The various embodiments described have the benefit of minimizing the risk for collisions, e.g. in OBSSs, by coordinating access to a shared transmission medium in a WLAN dependent on a traffic pattern of stations of a BSS. This provides an improved control scheme for increased throughput, which is efficient and more fair than known solutions. The proposed solution also opens up for optimized settings (channel access timing, size of access window etc.), which can complement the range/location grouping methods in the existing propositions outlined above. These proposed traffic pattern based assignment can thus be used "on top of" the prior art methods, or standalone without the "edge" classification.

Although features and elements are described above in particular combinations, one of ordinary skill in the art will appreciate that each feature or element may be used alone or in any combination with the other features and elements. It should also be noted that the proposed solutions will not affect the full functioning of legacy 802.11 devices. In addition to the 802.11 protocols described herein, the features and elements described herein may be applicable to other wireless systems.

The invention claimed is:

1. Method for coordinating access to a shared transmission medium in a Wireless Local Area Network (WLAN), comprising the steps of:

identifying a station associated with a first basic service set (BSS);

determining a priority level dependent on a traffic pattern of the station based on a predetermined rule;

assigning sets of time slots dependent on the priority level, including:
a first set of time slots for a first priority level, and
a second set of time slots for a second priority level, the second priority level being lower than the first priority level, the second set of time slots not including time slots of the first set of time slots; and providing stations of the first priority level access opportunity in time slots within the first set and the second set of time slots, while denying access opportunity to stations of the second priority level within the first set of time slots.

2. The method of claim 1, wherein the step of providing access opportunity in time slots assigned dependent on traffic pattern is carried out responsive to
determining that the station is in an edge region of the first BSS with respect to a first access point (AP).

3. The method of claim 2, comprising the step of
coordinating access opportunity provided to the station with other stations associated with a second overlapping BSS (OBSS).

4. The method of claim 1, wherein stations of the first priority level are provided with access opportunity in separate time slots of the first group.

5. The method of claim 1, wherein the step of determining a priority level includes correlating the traffic pattern of the station to a Quality of Service (QoS) access category (AC) according to Wi-Fi Multimedia (WMM).

6. The method of claim 1, wherein the step of determining a priority level includes
calculating a rolling average of packet size of data traffic for the station; and
setting a priority level dependent on calculated packet size.

7. The method of claim 1, wherein stations being provided with access opportunity in the same time slots are allowed access to the shared transmission medium under carrier sense multiple access (CSMA).

8. Apparatus for coordinating access to a shared transmission medium in a Wireless Local Area Network (WLAN), the apparatus comprising:
an access point (AP) configured to provide radio communication with stations in basic service sets (BSS);
a processor configured to execute program code; and
a memory comprising instructions that when executed by the processor cause the apparatus to:
determine a priority level dependent on a traffic pattern of the station based on a predetermined rule,
assign sets of time slots dependent on the priority level, including:
a first set of time slots for a first priority level, and
a second set of time slots for a second priority level, the second priority level being lower than the first priority level, the second set of time slots not including time slots of the first set of time slots; and
provide stations of the first priority level access opportunity in time slots within the first set and the second set of time slots, while denying access opportunity to stations of the second priority level within the first set of time slots.

9. The apparatus of claim 8, wherein the memory includes instructions that when executed cause the apparatus to determine a priority level for the traffic pattern based on a predetermined rule, and to assign time slots dependent on the priority level.

10. The apparatus of claim 8, configured to allow stations being provided with access opportunity in the same time slots access to the shared transmission medium under carrier sense multiple access (CSMA).

11. A computer program product for coordinating access to a shared transmission medium in a Wireless Local Area Network (WLAN), the computer program product comprising:
- a non-transitory computer-readable medium comprising a set of codes for causing a computer to:
  - determine a priority level dependent on a traffic pattern of the station based on a predetermined rule;
- assign sets of time slots dependent on the priority level, including:
  - a first set of time slots for a first priority level, and
  - a second set of time slots for a second priority level, the second priority level being lower than the first priority level, the second set of time slots not including time slots of the first set of time slots; and
- provide stations of the first priority level access opportunity in time slots within the first set and the second set of time slots, while denying access opportunity to stations of the second priority level within the first set of time slots.

* * * * *